United States Patent Office 3,306,732
Patented Feb. 28, 1967

3,306,732
PROCESS FOR PRODUCING ALUMINUM
Kiyoshi Toyoshima, Eiichi Ichiki, Hirosuke Ryu, and Yasuhiko Inoue, all of Niihama-shi, Japan, assignors to Sumitomo Chemical Company, Ltd., Osaka, Japan, a corporation of Japan
No Drawing. Filed Jan. 20, 1964, Ser. No. 338,614
Claims priority, application Japan, Jan. 24, 1963, 38/3,427
4 Claims. (Cl. 75—68)

This invention concerns a process for producing aluminum essentially comprising thermal decomposition of an alkylaluminum compound at a lower temperature than heretofore.

Though processes for producing aluminum by thermal decomposition of an alkylaluminum compound were already proposed by K. Ziegler et al. (for example, Angew. Chem., vol. 67, No. 16, 424–425 (1955), British Patent No. 788,619, Japanese patent publication No. 2,454, 1957 etc.), these have a disadvantage, among others, in that the alkylaluminum compound in the heating zone must be heated at a high temperature such as 200–300° C. in order to decompose the alkylaluminum compound thermally to isolate aluminum metal. Due to the fact that the decomposition of the alkylaluminum compound to isolate aluminum is strongly endothermic, it is comparatively difficult when carrying out this reaction on an industrial scale to keep the alkylaluminum compound in the heating zone within the above-mentioned reaction temperature range.

In the thermal decomposition, all the alkylaluminum compound in the heating zone must be heated at above the temperature of thermal decomposition, and consequently heat is applied generally through the walls of the reactor using a heating medium of high boiling point. In this case, as the temperature of the heating surface (walls of reactor) must be kept higher in accordance with the rise of the temperature of thermal decomposition, a heating medium of much higher boiling point is required, and it becomes more difficult to obtain the suitable heating medium.

Besides, unfavourable phenomena are sometimes recognized in the production of aluminum by thermal decomposition of alkylaluminum compounds, for instance, deposition of aluminum onto the heating surface. The tendency of deposition is increased mainly with increase of the decomposition temperature and partially with increase of the difference between the temperatures at the heating surface and in the reaction mass. Accordingly, if minimization or prevention of the deposition of aluminum at the heating surface is intended, to lower the decomposition temperature is an advantageous means.

If the decomposition can be effected at a lower temperature, the necessary area of heating surface can be reduced, since the deposition of aluminum onto the heating surface hardly occurs even when the difference between the temperatures at the heating surface and in the reaction mass is comparatively large.

This invention is based on a finding of a fact that, in a thermal decomposition of alkylaluminum compounds to produce aluminum plus olefins and hydrogen in a liquid phase, the temperature of decomposition necessary for the liberation of aluminum is lowered by the presence of a small quantity of a special metallic compound which is defined below.

Accordingly, an object of this invention is to lower the temperature necessary for the thermal decomposition in a process for producing aluminum by decomposing alkylaluminum compounds thermally in a liquid phase. Other objects will be apparent from the following descriptions.

In order to accomplish those objects, this invention provides a process for producing aluminum which comprises heating an alkylaluminum compound of the general formula:

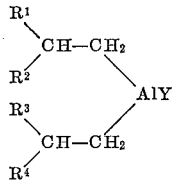

wherein $R^1$, $R^2$, $R^3$, and $R^4$ are respectively selected from the group consisting of alkyl radicals and hydrogen atom, and Y is selected from the group consisting of hydrogen atom and

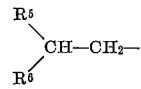

radical, $R^5$ and $R^6$ being respectively selected from the group consisting of alkyl radicals and hydrogen atom, in a liquid phase in the presence of at least one of the compounds of metals of groups I–B, IV–A, V–A, VI–A, VII–A and VIII in the Mendeleev periodic table, in a heating zone to a temperature at which said compound is decomposed to give aluminum, olefin and hydrogen gas, thereby to lower the temperature of thermal decomposition of the alkylaluminum compound and to facilitate the maintenance of the said temperature, and separating the resulting aluminum from the reaction mass in the heating zone.

For this invention, there may be used any alkylaluminum compound of the general formula:

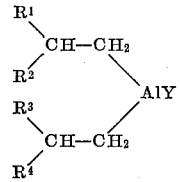

wherein $R^1$, $R^2$, $R^3$, $R^4$ and Y have the same meaning as above-identified, such as triethylaluminum, di-n-butylaluminum hydride, ethyldiisobutylaluminum, triisobutylaluminum, diisobutylaluminum hydride, tri-(2-methylbutyl)aluminum, di-(2-methylpentyl)aluminum hydride, tri-2 - ethylhexylaluminum, ethylisobutyl-2-ethylhexylaluminum, tri-n-octylaluminum and tri-n-dodecylaluminum. Each of $R^1$, $R^2$, $R^3$, $R^4$, $R^5$ and $R^6$ may be an a alkyl radical having a carbon number of up to 10. Moreover, the mixtures of more than two kinds of these compounds are naturally available. These alkylaluminum compounds may be subjected to thermal decomposition in a liquid phase in the absence or presence of at least one organic solvent such as petroleum, liquid paraffin, alkylbenzene, alkylnaphthalene, biphenyl and alkylalkoxyaluminum.

Metallic compounds employed for this invention, i.e. metallic compounds having the catalytic effect which accelerates the decomposition, are preferably halides, oxyhalides, carboxylates, acetylacetonates and alkoxy-compounds of metals of groups I–B, IV–A, V–A, VI–A, VII–A and VIII in the Mendeleev periodic table such as titanium chloride, titanium bromide, titanium fluoride, tetraethoxy-titanium, tetra-n-butoxytitanium, titanium stearate, vanadium chloride, chromyl chloride, chromium naphthenate, tetra - tert. - butoxychromium, manganese chloride, manganese stearate, manganese naphthenate, iron chloride, iron bromide, iron oxalate, iron stearate, iron naphthenate, iron oleate, iron acetylacetonate, cobalt chloride, cobalt stearate, cobalt palmitate, cobalt naphthenate, nickel chloride, nickel iodide, nickel acetate, nickel oxalate, nickel stearate, nickel naphthenate, nickel acetylacetonate, copper chloride and copper acetylacetonate; but any other compounds of said metals which have the catalytic decomposition-accelerating effect of lowering the temperature necessary for the thermal decomposition of alkylaluminum compounds are also available. These metallic compounds may be employed singly or in a combination of more than one kind of them.

The adequate amount of metallic compounds mentioned above which should be present in the heating zone at the thermal decomposition is 2–0.0001 mole percent, preferably 0.1–0.001 mole percent, based on the alkylaluminum compound in the heating zone. With the decrease of the amount of said metallic compound, the catalytic effect decreases. On the other hand, an excessive amount should be avoided because a part of said metallic compound is reduced gradually by the alkylaluminum compound in the course of thermal decomposition or metallic compound itself is thermally decomposed, and consequently aluminum is contaminated with the liberated metal and the purity of aluminum is lowered.

When an alkylaluminum compound is thermally decomposed in a liquid phase in the absence or presence of an organic solvent in the presence of a metallic compound as mentioned above, the temperature of decomposition necessary for the liberation of aluminum can be largely lowered, for instance, by 5° to 100° C., compared with the case in the absence of said metallic compounds, though the degree of lowering varies depending upon the conditions such as the kind of the starting alkylaluminum compound and the kind and amount of said metallic compound.

By way of example, in a process of thermal decomposition in which an amount of alkylaluminum compound corresponding to the consumed alkylaluminum compound is supplied from a feeding tank to a reactor so as to keep a constant amount of alkylaluminum compound in the reactor, triisobutylaluminum and said metallic compound, whose amount was 0.01 or 0.05 mole percent based on said triisobutylaluminum, were charged into the reactor and the feeding tank and subjected to thermal decomposition at a rate at which 2–5 (mole) percent of triisobutylaluminum in the reactor was decomposed per minute to liberate aluminum. The results for various metallic compounds are shown in Table 1. The temperatures of thermal decomposition were compared with the value in the same conditions in the absence of any metallic compound. The temperature of thermal decomposition with metallic compounds is, though it is variable depending upon the kind and amount of metallic compound, apparently lower than in the absence of metallic compound.

TABLE 1

| Metallic compound | Amount (mole, percent) | Temperature of decomposition (° C.) |
| --- | --- | --- |
| No addition | | 220–237 |
| Titanium tetrachloride | 0.05 | 145–160 |
| Titanium tetrachloride | 0.01 | 150–165 |
| Titanium tetrastearate | 0.05 | 149–163 |
| Titanium tetrastearate | 0.01 | 153–168 |
| Vanadium tetrachloride | 0.05 | 178–190 |
| Vanadium tetrachloride | 0.01 | 182–196 |
| Ferric chloride | 0.05 | 166–180 |
| Ferric chloride | 0.01 | 170–185 |
| Ferric stearate | 0.05 | 180–189 |
| Ferric stearate | 0.01 | 184–194 |

It is clear that a lowering of the temperature of thermal decomposition indicated in this table greatly facilitates the maintenance of the temperature necessary for thermal decomposition in an operation on an industrial scale in spite of the strong endothermic property of the thermal decomposition of alkylaluminum compounds.

The method according to this invention is applicable to any method of thermal decomposition for producing aluminum such as a batch method or a continuous method. In the case of a batch system, said metallic compound may be added only to alkylaluminum compound in the reactor, or may be added to alkylaluminum compound in the reactor and feeding tank. In the case in which a reactor of a continuous type is employed and the liberated aluminum is taken out continuously, said metallic compound may be added to either one or both of alkylaluminum compound in the reactor and that in the feeding tank.

Said metallic compounds in this invention having a catalytic effect of accelerating decomposition need not necessarily be added in the metallic compound state, but may be formed in the course of preparation of the alkylaluminum compound and subjected to thermal decomposition without separation from the alkylaluminum compound, or may be added in the metallic compound state in the course of preparation of the alkylaluminum compound.

The method according to this invention is explained by the following examples, which are given merely by way of illustration and not by way of limitation.

*Example 1*

After the air in a four-necked flask provided with a thermometer, a dropping funnel, a stirrer and a gas outlet connected with a gas reservoir was substituted with nitrogen, a mixture of 142 g. (1 mole) of diisobutylaluminum hydride and 0.0190 g. (0.0001 mole) of titanium tetrachloride was charged into both the flask and the funnel. The flask was heated gradually at the bottom by a flask-heater, and after controlling the temperature in such a way that the decomposition gas was formed at a rate of 0.015 mole/min. (in this case this quantity corresponds to 3 (mole) percent based on the diisobutylaluminum hydride in the flask), the mixture of diisobutylaluminum hydride and titanium tetrachloride was supplied from the funnel in an amount corresponding to the consumed amount based on the volume of said gas. The dropping was finished after ca. 33 minutes, and then the heating was stopped without delay. The yields of aluminum and decomposition gas were 27.2 g. and 78.5 l. (0° C., 1 atm.) respectively, and the temperature of decomposition in this case was 153°–160° C.

Thermal decomposition was executed at the same rate of formation of gas as described above, using a similar apparatus, charging a mixture of 142 g. (1 mole) of diisobutylaluminum hydride and 0.0380 g. (0.0002 mole) of titanium tetrachloride into the flask and 142 g. (1 mole) of diisobutylaluminum hydride into the funnel. In this case, the temperature of decomposition was 150°–162°C.

On the other hand, the temperautre had to be kept at 225°–230° C. in order to decompose diisobutylaluminum hydride thermally at a gas forming rate of 0.105 mole/min. in conditions the same as those described above, except that no titanium tetrachloride was added.

*Example 2*

After the air in a four-necked flask of an apparatus similar to the one used in Example 1 was substituted with nitrogen, a mixture of 198 g. (1 mole) of triisobutylaluminum and 0.0193 g. (0.001 mole) of vanadium tetrachloride was charged into the flask and the funnel. The flask was heated gradually at the bottom by a flask-heater, and after controlling the temperature in such a way that the decomposition gas was formed at a rate of 0.13 mole/min., the mixture containing triisobutylaluminum was supplied from the funnel in an amount corresponding to the consumed amount based on the valume of said gas. The dropping was finished after ca. 35 minutes, and then heating was stopped. The yields of aluminum and the decomposed gas were 26.9 g. and 101 l. (0° C., 1 atm.) respectively, and the temperature of decomposition in this case was 185°–191° C. On the other hand, the temperature had to be kept at 225°–231° C. in order to decompose triisobutylaluminum thermally at a gas forming rate of 0.13 mole/min. in conditions the same as those described above, except that no vanadium tetrachloride was added.

*Example 3*

After the air in a four-necked flask of an apparatus similar to the one used in Example 1 was substituted with nitrogen, a mixture of 142 g. (1 mole) of diisobutylaluminum hydride and 0.0155 g. (0.0001 mole) of chromyl chloride was charged into both the flask and the funnel.

The flask was heated gradually at the bottom by a flask-heater, and after controlling the temperature in such a way that the decomposition gas was formed at a rate of 0.105 mole/min., the mixture containing diisobutylaluminum hydride was supplied from the funnel in an amount corresponding to the consumed amount based on the volume of said gas. The dropping was finished after ca. 34 minutes, and then heating was stopped without delay. The yields of aluminum and the decomposed gas were 26.7 g. and 78.3 l. (0° C., 1 atm.) respectively, and the temperature of decomposition in this case was 180°–186° C.

*Example 4*

After the air in a four-necked flask of an apparatus similar to the one used in Example 1 was substituted with nitrogen, a mixture of 142 g. (1 mole) of diisobutylaluminum hydride and 0.0126 g. (0.0001 mole) of manganous chloride was charged in to both the flask and the funnel. The flask was heated gradually at the bottom by a flask-heater, and after controlling the temperature in such a way that the decomposition gas was formed at a rate of 0.105 mole/min., the mixture containing diisobutylaluminum hydride was supplied from the funnel in an amount corresponding to the consumed amount based on the volume of said gas. The dropping was finished after ca. 34 minutes, and then heating was stopped without delay. The yeilds of aluminum and the decomposition gas were 26.8 g. and 78.4 l. respectively, and the temperature of decomposition in this case was 160°–168° C.

The thermal decomposition was executed at the same rate of formation of gas as described above, using a similar apparatus, charging a mixture of 142 g. (1 mole) of diisobutylaluminum hydride and 0.0252 g. (0.0002 mole) of manganous chloride into the flask and 142 g. (1 mole) of diisobutylaluminum hydride into the funnel. In this case, the temperature of decomposition was 155°–170° C.

*Example 5*

After the air in a four-necked flask of an apparatus similar to the one used in Example 1 was substituted with nitrogen, a mixture of 198 g. (1 mole) of triisobutylaluminum and 0.0905 g. (0.0001 mole) of ferric stearate was charged into both the flask and the funnel. The flask was heated gradually at the bottom by a flask-heater, and after controlling the temperature in such a way that the decomposition gas was formed at a rate of 0.13 mole/min., the mixture containing triisobutylaluminum was supplied from the funnel in an amount corresponding to the consumed amount based on the volume of said gas. The dropping was finished after ca. 35 minutes, and then heating was stopped without delay.

The yields of aluminum and decomposed gas were 27.2 g. and 102 l. respectively, and the temperature of decomposition in this case was 187°–190° C.

*Example 6*

After the air in a four-necked flask of an apparatus similar to the one used in Example 1 was substituted with nitrogen, a mixture of 142 g. (1 mole) of diisobutylaluminum hydride and 0.0262 g. (0.0001 mole) of cupric acetylacetonate was charged into both the flask and the funnel. The flask was heated gradually at the bottom by a flask-heater, and after controlling the temperature in such a way that the decompositon gas was formed at a rate of 0.105 mole/min., the mixture containing diisobutylaluminum hydride was supplied from the funnel in an amount corresponding to the consumed amount based on the volume of said gas. The dropping was finished after ca. 33 minutes, and then heating was stopped without delay. The yields of aluminum and the decomposition gas were 27.5 g. and 78.5 l. respectively, and the temperature of decomposition in this case was 185°–194° C.

*Example 7*

After the air in a four-necked flask of an apparatus similar to the one used in Example 1 was substituted with nitrogen, a mixture of 156 g. (1 mole) of tri-n-propylaluminum and 0.0257 g. (0.0001 mole) of nickelous acetylacetonate was charged into both the flask and the funnel.

The flask was heated gradually at the bottom by a flask-heater, and after controlling the temperature in such a way that the decomposition gas was formed at a rate of 0.13 mole/min., tri-n-propylaluminum in an amount corresponding to the consumed amount based on the volume of said gas was supplied from the funnel. The dropping was finished after ca. 35 minutes, and then heating was stopped without delay. The yields of aluminum and the decomposition gas were 27.0 g. and 101 l. respectively, and the temperature of decomposition in this case was 185°–192° C.

On the other hand, the temperature had to be kept at 235°–239° C. in order to decompose tri-n-propylaluminum thermally at a gas forming rate of 0.13 mole/min. in conditions the same as those described above, except that no nickel acetylacetonate was added.

*Example 8*

After the air in a four-necked flask of an apparatus similar to the one used in Example 1 was substituted with nitrogen, a mixture of 198 g. (1 mole) of triisobutylaluminum and 0.0930 g. (containing 0.0001 atom of Fe) of iron naphthenate was charged into both the flask and the funnel. The flask was heated gradually at the bottom by a flask-heater, and after controlling the temperature in such a way that the decomposition gas was formed at a rate of 0.13 mole/min., the mixture containing triisobutylaluminum was supplied from the funnel in an amount corresponding to the consumed amount based on the volume of said gas. The dropping was finished after ca. 35 minutes, and then heating was stopped without delay. The yields of aluminum and the decomposed gas were 27.0 g. and 101 l. respectively, and the temperature of decomposition was 185°–190° C.

*Example 9*

After the air in a four-necked flask of an apparatus similar to the one used in Example 1 was substituted with nitrogen, a mixture of 198 g. (1 mole) of triisobutylaluminum, 214 g. (1 mole) of diisobutylaluminum n-butoxide and 0.0162 g. (0.0001 mole) of ferric chloride was charged into the flask, and a mixture of 198 g. (1 mole) triisobutylaluminum and 0.0162 g. (0.0001 mole) of ferric chloride was charged into the funnel. The flask was heated gradually at the bottom by a flask-heater, and after controlling the temperature in such a way that the decomposition gas was formed at a rate of 0.13 mole/min., the mixture containing triisobutylaluminum was supplied from the funnel in an amount corresponding to the consumed amount based on the volume of said gas. The dropping was finished after ca. 34 minutes, and then heating was stopped without delay. The yields of aluminum and the decomposed gas were 27.3 g. and 102 l. respectively, and the temperature of decomposition in this case was 175°–180° C. On the other hand, in order to decompose triisobutylaluminum thermally at a gas forming rate of 0.13 mole/min. in conditions the same as those described above, except that no ferric chloride was added, the temperature had to be kept at 237°–241° C.

*Example 10*

After the air in a four-necked flask of an apparatus similar to the one used in Example 1 was substituted with nitrogen, a mixture of 170 g. (1 mole) of ethyldiisobutylaluminum and 0.118 g. (0.0001 mole) of titanium stearate was charged into both the flask and the funnel. The flask was heated gradually at the bottom by a flask-heater, and after controlling the temperature in such a way that the decomposed gas was formed at a rate of 0.13 mole/min., the mixture of ethyldiisobutylaluminum and titanium tetrastearate was supplied from the funnel in an amount corresponding to the consumed amount based on the volume of said gas. The dropping was finished after ca. 33 minutes, and then heating was stopped without delay. The yields of aluminum and the decomposed gas were 27.1 g. and 101 l. respectively, and the temperature of decomposition in this case was 158°–166° C.

On the other hand, in order to decompose ethyldiisobutylaluminum thermally at a gas forming rate of 0.13 mole/min. in conditions the same as those described above, except that no titanium tetrastearate was added, the temperature had to be kept at 225°–232° C.

*Example 11*

After the air in a three-necked flask, provided with a thermometer, a stirrer and a common distilling apparatus which consists of a condenser connected with a gas reservoir and of a liquid receiver, was substituted with nitrogen, a mixture of 254 g. (1 mole) of dioctylaluminum hydride and 0.236 g. (0.0002 mole) of titanium tetrastearate was charged into the flask. Thermal decomposition was executed by heating the flask at the bottom at 192°–199° C. by a flask-heater. In order to avoid the lowering of the temperature of liquid in the flask by the formation of hydrocarbons containing octene as the main component in the course of reaction, the liquid hydrocarbons containing octene were distilled from the flask through the distilling apparatus, and thus the temperature of the liquid in the flask was maintained within the range mentioned above. After 10 minutes thermal decomposition, the heating was stopped. The yield of aluminum and the amount of the distilled liquid hydrocarbons were 8.8 g. and 51 g. respectively. On the other hand, in order to decompose the same amount of di-n-octylaluminum hydride within 10 minutes in similar conditions except that no titanium tetrastearate was added, the temperature had to be kept at 234°–240° C.

What we claim is:
1. A process for producing aluminum which comprises heating an alkylaluminum compound of the general formula:

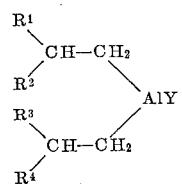

wherein $R^1$, $R^2$, $R^3$ and $R^4$ are respectively selected from the group consisting of alkyl radicals and hydrogen atom, and Y is selected from the group consisting of hydrogen atom and

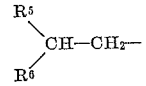

radical, $R^5$ and $R^6$ being respectively selected from the group consisting of alkyl radicals and hydrogen atom, in a liquid phase in the presence of at least one member selected from the group consisting of the halides, oxyhalides, carboxylates, acetylacetonates and alkoxy compounds of metals of groups I–B, IV–A, V–A, VI–A, VII–A and VIII in the Mendeleev periodic table, in an amount of 2–0.0001 mole percent based upon the amount of the alkylaluminum compound, in a heating zone to a temperature at which said alkylaluminum compound is decomposed to give aluminum, olefin and hydrogen gas, and separating the resulting aluminum from the reaction mass in the heating zone.

2. A process according to claim 1, wherein said metallic compound is at least one member selected from the group consisting of titanium tetrachloride, vanadium tetrachloride, chromyl chloride, manganous chloride, ferric stearate, cupric acetylacetonate, nickelous acetylacetonate, iron naphthenate, ferric chloride, and titanium tetrastearate.

3. A process according to claim 1, wherein the thermal decomposition is executed in an inert organic solvent.

4. A process according to claim 3, wherein said organic solvent is at least one member selected from the group consisting of petroleum, paraffin, alkylbenzene, alkylnaphthalene, biphenyl and alkylalkoxyaluminum.

References Cited by the Examiner

UNITED STATES PATENTS

| | | | |
|---|---|---|---|
| 3,032,574 | 5/1962 | Ziegler et al. | 75—68 |
| 3,154,407 | 10/1964 | Ikeda et al. | 75—68 |
| 3,170,787 | 2/1965 | Tanaka et al. | 75—68 |

FOREIGN PATENTS

| | | |
|---|---|---|
| 600,349 | 6/1960 | Canada. |

DAVID L. RECK, *Primary Examiner.*

H. W. TARRING, *Assistant Examiner.*